United States Patent [19]
Miller

[11] Patent Number: 4,821,849
[45] Date of Patent: Apr. 18, 1989

[54] CONTROL METHOD AND MEANS FOR VIBRATION ATTENUATING DAMPER

[75] Inventor: Lane R. Miller, Cary, N.C.

[73] Assignee: Lord Corporation, Erie, Pa.

[21] Appl. No.: 913,067

[22] Filed: Sep. 29, 1986

[51] Int. Cl.$^4$ ............................................. F16F 9/18
[52] U.S. Cl. .................................... 188/280; 188/285
[58] Field of Search ............... 188/266, 280, 285, 287, 188/299; 267/8 R, 34, 217; 280/707

[56] References Cited

U.S. PATENT DOCUMENTS

| 2,934,175 | 4/1960 | Schnitzer | 188/280 |
| 3,255,850 | 6/1966 | Gray | 188/280 |
| 3,807,678 | 4/1974 | Karnopp et al. | 248/358 R |
| 4,491,207 | 1/1985 | Boonchanta et al. | 188/299 |
| 4,696,489 | 9/1987 | Fujishiro et al. | 280/707 |
| 4,742,998 | 5/1988 | Schubert | 267/136 |

OTHER PUBLICATIONS

Crosby et al., Vibration Control Using Semi-Active Force Generators, Transaction of the ASME Paper No. 73-DET-122.
Margolis et al., Heave Mode Dynamics of a Tracked Air Cushion Vehicle With Semiactive Airbag Secondary Suspension, Journal of Dynamic Systems Measurement and Control, Dec. 1975, pp. 399-407.
Margolis, Semi-Active Control of Wheel Hop in Ground Vehicles, Vehicle System Dynamics, 1983, pp. 317-330.
Krasnicki, The Experimental Performance of an "On-Off", Active Damper, Lord Corporation Technical Article, Circa 1981.
Hrovat et al., An Experimental Comparison Between Semiactive and Passive Suspensions for Air-Cushion Vehicles, Int. J. of Vehicle Design, 1981.
Lord Corporation Semi-Active Suspensions, Lord Corporation Technical Article Primary Examiner—Duane A. Reger
Attorney, Agent, or Firm—Bell, Seltzer, Park & Gibson

[57] ABSTRACT

A damper of the semi-active type is controlled such that the damping forces generated by the damper, in response to relative movement between spaced members interconnected by it, are caused to be of minimal (ideally zero) magnitude when the product of the relative displacement between the members and the relative velocity between the members is greater than zero. The foregoing control policy may be implemented by purely mechanical elements, or by electronic elements of relatively simple and inexpensive types.

16 Claims, 2 Drawing Sheets

CONTROL METHOD AND MEANS FOR VIBRATION ATTENUATING DAMPER

This invention relates to vibration attenuating mounts and systems incorporating at least one damper of the "semi-active" type. The invention more specifically relates to an improved method and means for controlling the operation of such a damper.

BACKGROUND OF THE INVENTION

Dampers have long been used in vibration and/or shock attenuating systems, such as the suspension systems of automobiles. Although the dampers may take other forms, they commonly comprise piston and cylinder assemblies having variable volume chambers interconnected by an orifice or passageway through which hydraulic fluid is displaced and by which such fluid is "throttled" to an extent that is a function of the size of the orifice. Most such dampers are of a purely "passive" type that undergo extension and compression, with ensuing generation of damping forces, only in response to relative movement of the spaced members (such as the body and frame components of an automobile) interconnected by the damper. The damping forces of passive dampers always oppose the relative movement and will under certain operational conditions undesirably amplify, rather than attenuate the transmission of vibrations and forces between the members interconnected by the damper.

The foregoing limitation of passive dampers is not shared by fully "active" ones. In addition to a piston and cylinder assembly, active fluid dampers include a pump or similar source of pressurized fluid, together with rapidly-acting control means for regulating the flow of fluid between such source and the assembly. This enables both the magnitude and the direction of the damping forces generated by the damper to be substantially independent of the input or excitation velocity, which in turn may and usually will result in superior vibration attenuation. The foregoing advantage of active dampers over passive ones is offset to a significant extent, however, by their normally being considerably more costly, bulky and/or heavy due to their inclusion of a pump or similar source of high pressure fluid. Any one of the foregoing factors may render active dampers unsuitable for many applications.

There are also dampers of the so-called "semi-active" type. A semi-active damper resembles a passive one in that it does not include a pump or other source of pressurized fluid, and can only generate damping forces in response to and in opposition to relative movement between the members interconnected by it. A semi-active damper resembles an active one in its inclusion of means for controlling, albeit to only a limited extent, the damping forces generated by the damper. More specifically, a semi-active damper can at desired times reduce the magnitude of the damping forces generated during operation by relative movement between the member interconnected by the damper. Such control may be realized by the provision of adjustable valve means in association with the orifice or passageway interconnecting the variable volume chambers of the damper, together with control means for dynamically adjusting the valve during damper operation. Simple semi-active dampers have long been employed for special purposes, such as to prevent their "bottoming-out" during extreme extension and/or compression. While these dampers may be satisfactory for specific limited purposes, the degree of vibration attenuation that they achieve is not significantly different from that realized by passive dampers, and does not approach that realized by active ones.

In contrast to the customary type of semi-active damper, the damper disclosed in U.S. Pat. No. 3,807,678 is adapted to and does achieve a degree of vibration attenuation or isolation approaching that realized by a comparable active damper. A semi-active damper of the type disclosed in such patent ideally should generate damping forces of appreciable magnitude only at those times when the effect thereof would be to attenuate the transmission of vibratory and shock forces to the member that is to be isolated. At all other times the damper ideally would not generate any damping forces. While the foregoing ideal result cannot be completely realized in practice, it can be approached and a resulting high degree of vibration attenuation or isolation can be achieved when the damper is operated in accordance with an appropriate control policy. One such policy disclosed in U.S. Pat. No. 3,807,678 is based upon determination of the instantaneous relative velocity between the supported and supporting members interconnected by the damper, and upon the instantaneous absolute velocity of the supported member. When the product of the aforesaid absolute and relative velocities is greater than zero, its control means causes the damper to produce damping forces of either the full magnitude realizable from the then transpiring relative movement between the supported and supporting members, or of a reduced but still significant magnitude adapted to offset the force then tending to undesirably displace the supported member. When the aforesaid product is less than zero the damping force is caused to be of minimal (ideally zero) magnitude. The aforesaid control policy produces excellent results. However, it is somewhat difficult and costly to implement since the absolute velocity of the supported member cannot readily be directly ascertained, and is at times indirectly calculated as by integration of output data received from an accelerometer associated with the supported member. This relatively expensive way of implementation detracts from the control policy, and may render it unsuitable for some semi-active damper applications.

SUMMARY OF THE INVENTION

The present invention provides an improved method and means for controlling the operation of a semi-active damper of the above-discussed type that achieves a degree of vibration attenuation or isolation approaching that realizable by fully active dampers. The damper of the present invention is controlled in accordance with a policy based upon the product of the instantaneous relative displacement and the instantaneous relative velocity between the supporting and supported members interconnected by the damper. When such product is less than zero, the control means causes the damping forces generated by relative movement across the damper to be of significant magnitude. When the product is greater than zero, the control means causes the damping forces to be of a minimal (ideally zero) magnitude. The sensors used in implementing the aforesaid control policy may be accelerometers whose outputs are integrated to provide velocities and are double integrated to provide displacements. However, the use of such expensive and complex components and procedures is not required, and the sensors preferably are of more simple types that directly detect the relative displacements and velocities between the supported and supporting members. In one embodiment of the invention the control policy is implemented by relatively simple electrical means, while in the other embodiments the damper control means are of purely mechanical types.

DESCRIPTION OF THE PRIOR ART

U.S. Pat. No. 4,491,207 discloses a semi-active damper adapted to be controlled in accordance with the control policy discussed previously herein in connection with U.S. Pat. No. 3,807,678, and based upon the sign (i.e., plus or minus) of the product of the absolute velocity of the supported member and the relative velocity between the supported and supporting members.

DESCRIPTION OF THE DRAWINGS

Other features of the invention will be apparent from the following description of an illustrative embodiment thereof, which should be read in conjunction with the accompanying drawings, in which.

DESCRIPTION OF THE PREFERRED EMBODIMENT

Figure 1:
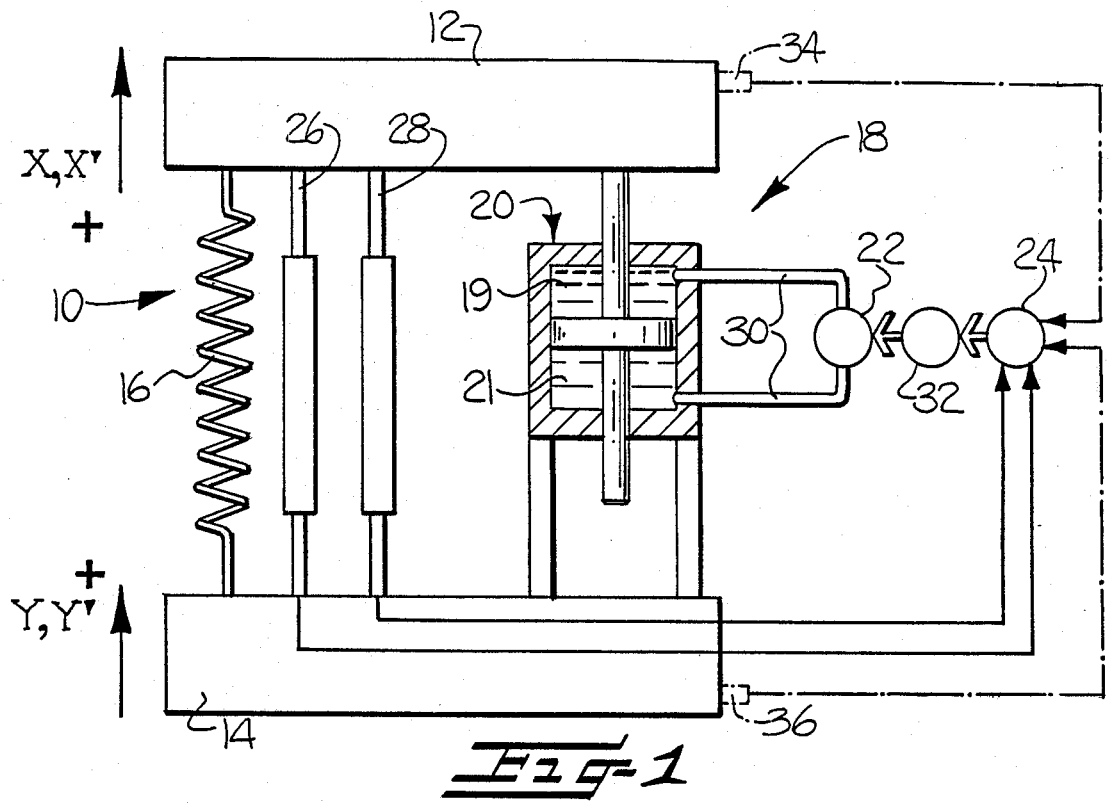
FIG. 1 is a partially schematic view of a vibration attenuating suspension or mounting system having a semi-active damper constructed and operable in accordance with the invention.

FIG. 1 is a partially schematic representation of a single degree of freedom suspension or mounting system 10 interconnecting vertically spaced and relatively moveable supported and supporting members 12, 14, respectively.

By way of example, members 12, 14 might be the body and frame components of an automobile or other motor vehicle (not shown), in which event one of the functions of system 10 customarily would be to isolate supported member 12 insofar as possible from the vibratory and/or shock forces transmitted to member 14 by such things as road surface irregularities, engine firing disturbances, etc. The designations x, x' respectively designate the vertical displacement and the absolute velocity of member 12, it being arbitrarily indicated that these are positive when in an upward direction and thus are negative when in a downward direction. The same sign convention and the letters y, y' similarly designate the vertical displacement and the absolute velocity of supporting member 14. When system 10 is at rest x, x', y and y' are all zero.

System 10 illustratively includes compression spring means 16 and semi-active damper means 18 that extend in substantially parallel relationship to each other between members 12, 14 and are connected thereto. Spring 16 provides vertical support for member 12 while permitting vertical movement between it and supporting member 14. As schematically shown in FIG. 1, damper means 18 includes a damper assembly 20 of the hydraulic piston and cylinder type, electrically adjustable valve means 22, and control means including a microprocessor or computer-like controller 24 for varying the operating condition of valve 22 in accordance with a hereinafter discussed control policy and signal data received from sensors 26, 28. Controller 24 and sensors 26, 28 constitute means for monitoring the relative displacement and velocity of members 12, 14. The cylinder component of assembly 20 is secured to supporting member 14, while the upper end of the piston rod of the assembly is secured to supported member 12. Relative vertical movement between members 12, 14 therefore displaces hydraulic fluid through the valve 22 and an associated conduit 30 interconnecting the piston-separated chambers 19, 21 within the cylinder component of assembly 20. The rod of assembly 20 illustratively and preferable extends through both cylinder chambers 19, 21, such that the amount of fluid displaced between the chambers is the same irrespective of whether the displacement is produced by compression or extension of the assembly. This eliminates the need for an accumulator or the like (not shown) in the hydraulic fluid circuitry. Valve 22 is of a type rapidly adjustable between at least two different operating positions or conditions. In its first operating condition valve 22 significantly throttles or restricts fluid flow through conduit 30. This results in the generation of significant damping forces which, in keeping with those generated by any passive or semi-active damper, oppose the then transpiring relative movement of members 12, 14 that has caused the flow-producing relative movement between the piston and cylinder components of assembly 20. In its second operating condition, valve 22 is fully open and produces only minimal damping. While ideally no damping forces are generated when the valve is in its second condition, this is in practice not possible and the best achievable result is a minimal damping force approaching zero. Very rapid adjustive transitions from one to the other of the operating conditions of valve 22 may be produced by control signals transmitted to the valve from controller 24 via a power amplifier 32.

The preprogrammed control policy in accordance with controller 24 operates is based upon the product of the relative displacement (x-y) and the relative velocity (x'-y') between members 12, 14. When the aforesaid product is less than zero or negative, i.e. when (x-y) (x'-y')<0, controller 24 causes valve 22 to occupy its first condition and significant damping force is generated when members 12, 14 move relative to each other. On the other hand, when the aforesaid product is positive or greater than zero, i.e. when (x-y) (x'-y')>0, controller 24 causes valve 22 to occupy its second condition where only minimal (ideally zero) damping occurs. The relative displacement (x-y) and the relative velocity (x'-y') are each zero when system 10 is at rest.

As is indicated by phantom lines in FIG. 1, the sensors providing input data to controller 24 might be accelerometers 34, 36 that respectively detect accelerations of members 12, 14 and transmit signal data from which a relatively sophisticated controller 24 could, by integration and double integration procedures, calculate the absolute displacements and velocities of the members, and then further calculate their relative displacements and velocities and the product thereof. However, the aforesaid system is somewhat costly and cumbersome to implement. It also provides more data than is needed when the adjustable valve means of the system is not of the type adapted to control, insofar as such control is possible, the magnitude of the damping forces generated at those times when damping is called for by the control policy. When the valve means 22 is of the simpler two-condition type previously described, accelerometers need not be and preferably are not employed. Instead, controller 24 may and illustratively does receive its inputs from a relative displacement sensor 26 and a relative velocity sensor 28, which each have one end connected to one of the members 12, 14 and an opposite end connected to the other of such members. Sensor 26 preferably in a linear variable differential transformer (LVDT), and sensor 28 preferably is a linear velocity transducer (LVT). Both types of devices are well known in the art, and are commercially available from Schaevitz Engineering of Pennsauken, N.J., among other possible sources. When system 10 is at rest the signals of sensor 26, 28 are zero. The sign of the signals emitted at other times by sensors 26, 28 indicates the "direction" of the relative displacements and velocities between members 12, 14. Thus, when the displacement between members 12, 14 "compresses" them (i.e., causes them to be closer together than they normally are), the signal emitted by sensor 26 is negative. When the members are in an extended or separation displacement condition, the sign of the signal produced by sensor 26 is positive. Similarly, the signals produced by sensors 28 are negative when the velocity of member 12 relative to the velocity of member 14 produces or tends to increase their "compression", and is positive when the relative velocity between the members tends to increase separation thereof. The only "calculations" which controller 24 need perform, in implementing its preprogrammed control policy, is that of distinguishing the situation wherein the signals received from sensors 26, 28 are of like sign, from the situation wherein the signals are of opposite sign. This may be done by a controller 24 of simple and economical type.

Figure 2:
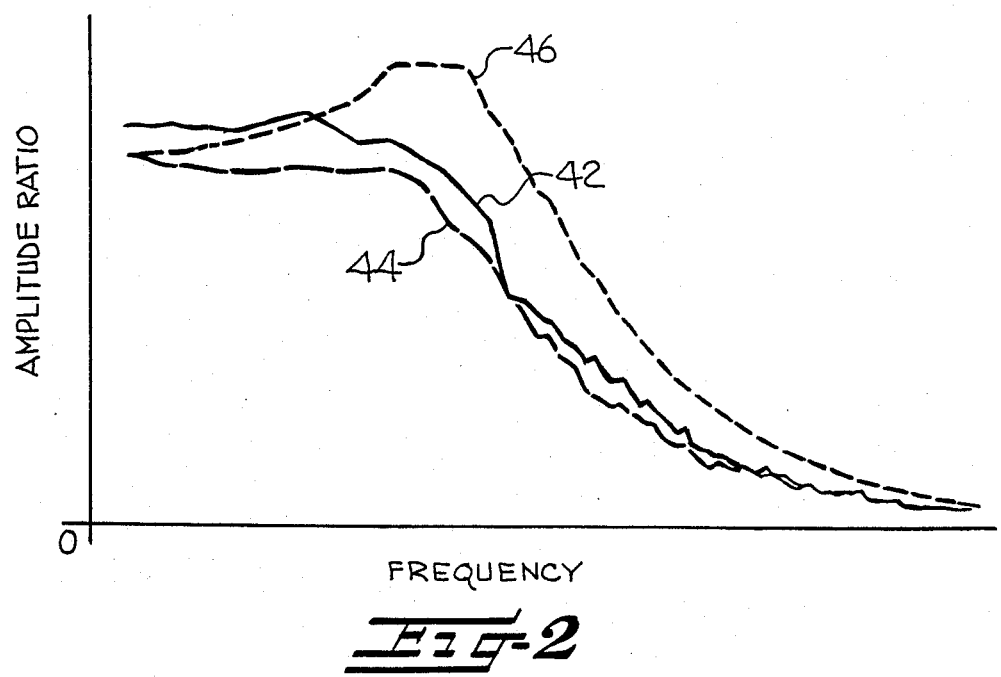
FIG. 2 is a graph of transmissability curves produced by computer simulations of the operation of a passive damper and two semi-active damper utilizing different control policies.
Figure 3:
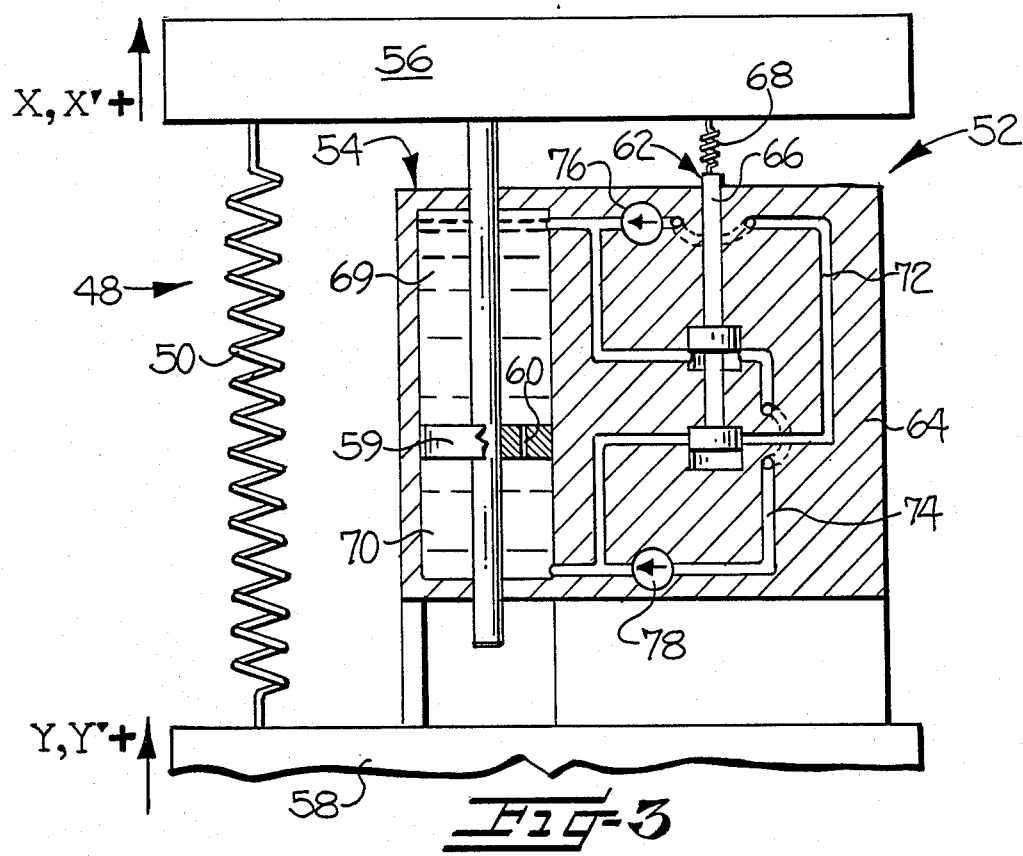
FIGS. 3 and 4 are partially schematic representations of other embodiments of vibration attenuating systems having semi-active dampers constructed and operable in accordance with the invention.

Referring now to FIG. 2, the transmissibility curve 42 is that resulting from computer simulation of a vibration attenuating system having a semi-active damper operated in accordance with the control policy of present invention. The curve 44 is that resulting from computer simulation of a similar vibration attenuating system in which the semi-active damper was operated in accordance with the prior art discussed control policy predicated upon the product of the supported member absolute velocity and the relative velocity between the supported member and the supporting member. In each of the foregoing two cases the valve of the semi-active damper was shifted between only two positions and no attempt was made, during those times when the valve position was such as to cause generation of damping forces of substantial magnitude, to modulate the magnitude of such forces. The remaining curve 46 of FIG. 3 is that resulting from computer simulation of a vibration attenuating system utilizing a passive damper in lieu of a semi-active one. The undamped natural frequency of each of the three systems was 1.0 hertz. In the two systems utilizing a semi-active damper, the damper had a damping coefficient (i.e., ratio of actual damping to critical damping) of 0.707 when the damper control valve condition was such as to produce substantial damping, and a damping coefficient of 0.1 when the valve condition was such as to produce only minimal damping. As is indicated by comparison of curve 42 with curves 44, 46, the performance of the system having a semi-active damper controlled in accordance with the present control policy (curve 42) approaches but is not quite as good as that of the other system employing a semi-active damper (curve 44), and is clearly superior to that of the system having a passive damper (curve 46) except at the lower excitation frequencies. In many utilizations the lower cost and greater reliability of the sensors 26, 28 and controller 32 usable in implementing the control policy of the present invention, versus the control policy based upon the product of absolute and relative velocities, more than compensates for the relatively small difference in performance of the two systems utilizing semi-active dampers.

FIG. 3 is a partially schematic showing of a vibration attenuating system 48 that implements the control policy of the invention without the use of any electrical components. In keeping with previously described system 10, system 48 has spring means 50 and semi-active damper means 52, the latter including a hydraulic piston and cylinder damper assembly 54, extending in parallel relationship to each other between supported and supporting members 56, 58. Assembly 54 differs from the previously described assembly 20 of system 10 (FIG. 1) in that its piston 59 has a small passageway 60 extending therethrough. Damper means 52 further includes spool valve means 62 having a body element 64 integral with or fixedly secured to supporting member 58 and the cylinder component of assembly 54. The spool-like operator element 66 of valve 62 has a pair of enlarged portions upon a vertically extending stem portion whose upper end is connected to supported member 56 by spring means 68. Spring 68, which has a very low stiffness in relation to that of spring 50, resiliently maintains valve element 66 in its illustrated upward or first position when members 56, 58 are (as shown) in a "separation" or "extension" condition, while permitting vertical movement of element 66 to a downward or second position when members 56, 58 are in "compression". The fluid containing chambers 69, 70 within the cylinder component of assembly 54 are interconnected by two passageways 72, 74 having common end sections and a cross sectional area substantially greater than that of piston passageway 60. The flow of fluid through passageway 72, 74 is controlled by check valves 76, 78, respectively associated therewith, and by valve 62. Check valve 76 permits fluid flow through passageway 72 from cylinder chamber 70 into cylinder chamber 69, but not in the opposite direction. Check valve 78 permits fluid flow through passageway 74 from chamber 69 and to chamber 70 of the cylinder component of assembly 54, but not in the opposite direction. When in its illustrated upward position, valve element 66 permits substantially unrestricted flow through passageway 74 while blocking flow through passageway 72. When the spool occupies its second or lower position, valve 62 permits free fluid flow through passageway 72, while blocking flow through passageway 74.

The following examples illustrate the manner in which the purely mechanical system 48 of FIG. 3 automatically implements the previously described control policy of the present invention.

EXAMPLE 1

Both the relative displacement (x-y) and the relative velocity (x'-y') of members 56, 58 are positive, such that their product is greater than zero. The positive relative velocity of members 56, 58 tends to extend assembly 54, and thus to displace fluid from upper chamber 69 to lower chamber 70 of the cylinder component of the assembly. The positive relative displacement (separation condition between members 56, 58) causes valve element 66 to occupy its upward first position, allowing substantially free fluid flow through passageway 74 from chamber 68 to chamber 70. The damping forces generated are therefore of the desired minimal magnitude.

EXAMPLE 2

The relative dynamic displacement (x-y) is again positive but the relative velocity (x'-y') is negative, such that the product thereof is negative or less than zero. The relative velocity condition tends to increase compression of assembly 54, and thus to displace fluid from the lower cylinder chamber 70. The relative displacement condition causes valve element 66 to occupy its upward or first position, in which it blocks fluid flow through passageway 72 from chamber 70. Flow through passageway 74 is precluded by check valve 78. The fluid within chamber 70 can pass from it only via the restrictive passageway 60 within the piston of assembly 54, which produces significant damping forces.

EXAMPLE 3

The relative dynamic displacement (x-y) is negative and the relative velocity (x'-y') is also negative, such that the product thereof is positive. The relative velocity condition tends to increase compression of assembly 54, and thus to displace fluid from lower cylinder chamber 70. The negative relative displacement condition causes valve element 66 to occupy its lower or second position, in which it permits substantially free fluid flow through passageway 72 from lower chamber 70 to upper chamber 69 of the cylinder component of assembly 54. The damping forces are of minimal magnitude.

EXAMPLE 4

The relative dynamic displacement (x-y) is negative and the relative velocity (x'-y') is positive, such that their product is negative. The relative velocity condition tends to increase extension of assembly 54, and thus to displace fluid from upper cylinder chamber 69. The relative displacement condition causes valve element 66 to occupy its lower or second position, in which it blocks fluid flow from upper chamber 69 through passageway 74. Check valve 76 prevents flow from chamber 68 through passageway 72. The fluid therefore is forced through restricted piston passageway 60 of assembly 54, generating substantial damping forces.

Figure 4:
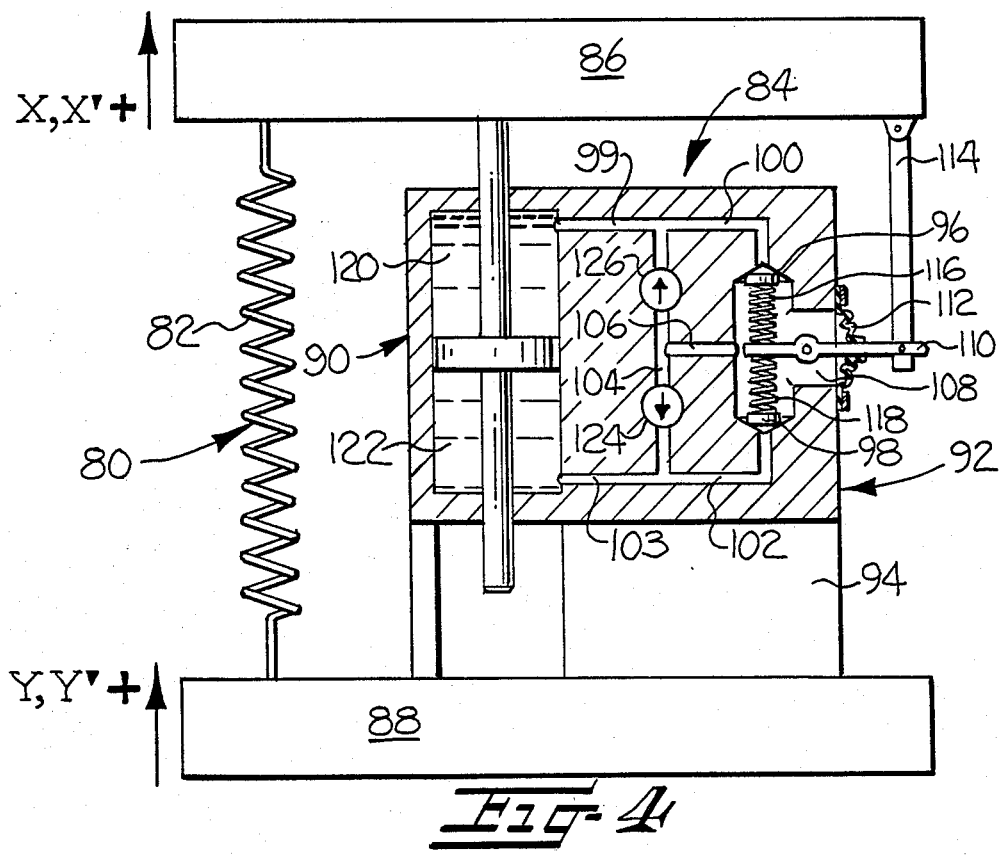

Another fully mechanical system 80 is shown in FIG. 4 of the drawings. It includes spring means 82 and passive damper means 84 interconnecting supported and supporting member 86, 88. Damper means 84 includes a piston and cylinder damper assembly 90, and valve means 92 having a body element 94 and valve operator elements 96, 98. Valve body 94 is attached to or integral with (as shown) the cylinder component of assembly 90, and has therein a valve cavity 108 and a plurality of passageways 99, 100, 102, 103, 104, 106. A lever 110 pivotally mounted within cavity 108 projects outwardly therefrom through a flexible seal 112. The outer end portion of lever 110 in pivotally connected to an activating lever 114 depending downwardly from supported member 86. The inner end portion of lever 110 is connected by coil springs 114, 116 to valve elements 96, 98. Spring 116 resiliently maintains valve element 96 in its illustrated position wherein the valve element is closely adjacent a complementary seat located at the juncture of passageway 100 and cavity 108. Spring 118 similarly resiliently maintains valve element 98 in its illustrated position wherein the element is closely adjacent a complementary seat at the juncture between cavity 108 and passageway 102. The forces biasing valve elements toward their respective seats are of very small magnitude when lever 110 occupies its illustrated central position. Such forces change when lever 110 pivots in response to relative displacements of members 86, 88. Thus, when relative displacement of members 86, 88 places them in a condition of compression, the ensuing clockwise (as viewed in FIG. 4) pivotal movement of lever 110 increases the biasing force exerted by spring 116 upon valve element 96, while simultaneously decreasing the biasing force upon valve element 98. Counterclockwise pivotal movement of lever 110, in response to the displacement of members 86, 88 in extension, has the opposite effect, decreasing the biasing force on element 96 and increasing the force on element 98. Whenever either valve element 96, 98 is subjected to the aforesaid increased biasing force, it throttles any pressure induced fluid flow from its associated passageway 100 or 102 into valve cavity 108. At all other times valve elements permit substantially free fluid flow from passageways 100, 102 into cavity 108. The construction and function of components 86, 88, 116, 118 is similar to that of conventional direct operated pressure valves which may be adjusted, by varying the length of their biasing springs, so as to open when under pressures of selected magnitude.

The following examples illustrate how system 80 automatically implements the control policy of the present invention.

EXAMPLE 1

Both the relative displacement (x-y) and the relative velocity (x'-y') of members 86, 88 are positive, such that their product is greater than zero. The relative velocity condition of members 86, 88 tends to displace fluid from upper chamber 120 to lower chamber 122 of the cylinder component of assembly 90. The separation condition of displacement pivots lever 10 in a counterclockwise direction, increasing the biasing force upon lower valve element 98 while further decreasing the biasing force upon valve element 96. Fluid flows substantially freely (only minimal damping) from cylinder chamber 120 to cylinder chamber 122 via passageways 99, 100, valve cavity 108, passageway 106, passageway 104 and its check valve 124, and passageway 103.

EXAMPLE 2

The relative displacement (x-y) of members 86, 88 is positive. Their relative velocity (x'-y') is negative, as is the product of (x-y) and (x'-y'). The relative velocity condition tends to compress assembly 90, and thus to displace fluid from cylinder chamber 122 to cylinder chamber 120. Fluid flows between such chambers via passageways 103 and 102, cavity 108, passageway 106, passageway 104 and its check valve 126, and passageway 99. However, the flow is restricted by valve element 118 due to the increased biasing force imposed thereon by spring 118 as a result of counterclockwise rotation of lever 110. The generated damper forces are of significant magnitude.

EXAMPLE 3

The relative dynamic displacement (x-y) is negative and the relative velocity (x'-y') is also negative. The product of (x-y) and (x'-y') is therefore positive. The relative velocity condition tends to compress assembly 90 and thus displace fluid from lower cylinder chamber 122. The negative relative displacement condition causes lever 110 to undergo clockwise pivotal movement which reduces any biasing force upon valve element 98. This allows fluid to flow substantially freely from cylinder chamber 122 to cylinder chamber 120 via passageways 103, 102, cavity 108, passageway 106, passageway 104 and check valve 126, and passageway 99. Only minimal damping forces are generated.

EXAMPLE 4

The relative dynamic displacement (x-y) and the relative velocity (x'-y') are negative and positive, respectively. Their product therefore is negative. The relative velocity condition tends to extend assembly 90, and thus to displace fluid from upper cylinder chamber 120. The negative displacement condition causes clockwise pivoted movement of lever 110 and increase of the biasing force upon valve element 96. Such valve element therefore throttles the fluid flowing from chamber 120 to chamber 122 via passageways 99 and 100, cavity 108, passageway 106, passageway 104 and check valve 124, and passageway 103. Damping forces of significant magnitude are generated.

While preferred embodiments of the invention have been specifically shown and described, this was for purposes of illustration only and not for purposes of limitation, the scope of the invention being in accordance with the following claims.

I claim:

1. In a system for attenuating the transmission of vibratory forces and the like between first and second members spaced from and movable relative to each other, said system including a semi-active damper assembly interconnecting said members and normally generating damper forces in response to relative movement therebetween, the improvement comprising:
control means for causing the magnitude of said damper forces to be relatively small whenever the product of the relative displacement of said members and the relative velocity of said members is greater than zero.

2. A system as in claim 1, wherein said control means includes monitoring means for monitoring the relative displacements of said members.

3. A system as in claim 2, wherein said monitoring means is a linear variable differential transformer.

4. A system as in claim 3, wherein said control means further includes means for monitoring said relative velocity of said members.

5. A system as in claim 4, wherein said relative velocity monitoring means is a linear velocity transducer.

6. A system as in claim 1, wherein said damper assembly includes a piston element and a cylinder element defining variable volume chambers containing hydraulic fluid, one of said elements being connected to one of said members and the other of said elements being connected to the other of said members, passageway means interconnecting said chambers, said control means including valve means for controlling fluid flow through said passageway means.

7. A system as in claim 6, wherein said valve means includes valve elements movable relative to each other, and mechanical means interconnecting one of said elements with one of said members and another of said elements with the other of said first and second members for imparting relative movement to said valve elements in response to relative displacement of said first and second members.

8. A system as in claim 7, wherein said valve means further includes check valve means.

9. In a system for attenuating force transmission between first and second members spaced from and movable relative to each other, said system including a semi-active damper assembly interconnecting said members and normally generating damper forces in response to relative movement therebetween, the improvement comprising:
control means for causing said damper forces to be of reduced magnitude whenever (x-y) times (x'-y') is greater than zero, wherein x and y are the respective instantaneous dynamic displacements of said first and second members, and x' and y' are the respective instantaneous absolute velocities of said members.

10. In the method of operation of a semi-active damper assembly interconnecting first and second members spaced from and movable relative to each other, said damper assembly normally generating damping forces of significant magnitude in response to said relative movement, the improvement comprising:
causing the damping forces generated by the damper to be of reduced magnitude whenever the product of the relative displacement between said members and the relative velocity between said members is greater than zero.

11. A method as in claim 10, and further including monitoring the relative dynamic displacement of said members, and monitoring the relative dynamic velocity of said members.

12. A system for attenuating the transmission of vibration and the like between first and second members spaced from and movable relative to each other, comprising:
passive spring means and semi-active damper means extending in parallel relationship to each other and interconnecting said members;
said damper means including a damper assembly containing hydraulic fluid and normally generating damping forces of significant magnitude in response to relative movement between said members, and control means operatively associated with said assembly for causing the damping forces generated thereby to be of minimal magnitude when the product of the relative displacement of said members and the relative velocity of said members is greater than zero;
said control means including a hydraulic fluid control valve member having a valve element and a body element movable relative to each other to define first and second valve differing conditions of said valve member, one or any of said elements being fixedly connected to one of said first and second members for movement therewith
and means resiliently connecting the other said valve elements to the other said first and second members.

13. A system as in claim 5, wherein said damper assembly has variable volume fluid chambers between which said hydraulic fluid is displaced by relative movement between said first and second members, and further including a first and second passageway interconnecting said chambers, said valve member controlling fluid flow through said passageways.

14. A system as in claim 13, wherein said valve member permits fluid flow through one of said passageways and blocks fluid flow through the other of said passageways.

15. A system as in claim 14, and further including check valve means for limiting the direction of fluid flow through said first and second passageways, and a third passageway interconnecting said variable volume chambers of said damper assembly for conducting fluid therebetween when flow through said first and second passageways is blocked.

16. A system as in claim 15, wherein said damper assembly includes a piston element located intermediate and forming part of said variable volume chambers, said third passageway extending through said piston element.

* * * * *